E. BRICK.
Thill-Couplings
No. 153,531. Patented July 28, 1874.
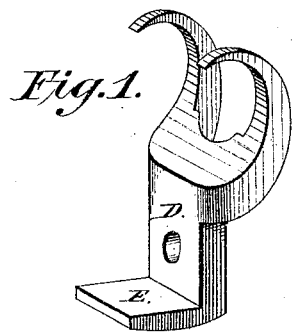
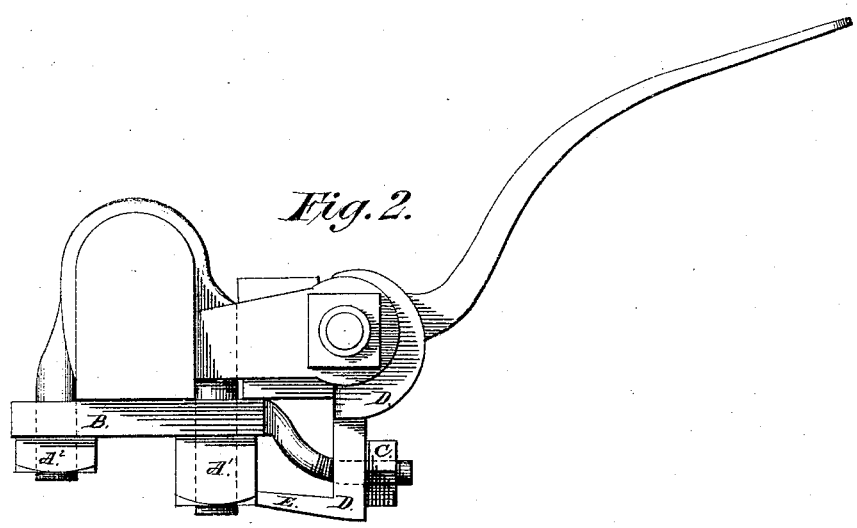
Attest:
S. Knecht
W. B. Brock
Inventor:
Edward Brick

UNITED STATES PATENT OFFICE.

EDWARD BRICK, OF WASHINGTON, D. C., ASSIGNOR TO GEORGE W. JOY.

IMPROVEMENT IN THILL-COUPLINGS.

Specification forming part of Letters Patent No. 153,531, dated July 28, 1874; application filed July 16, 1874.

*To all whom it may concern:*

Be it known that I, EDWARD BRICK, of the city of Washington, District of Columbia, have invented a new and useful Improvement in Thill-Couplings; and do declare that the following is a true and accurate description thereof, reference being had to the accompanying drawings and to the letters of reference marked thereon, and being a part of this specification, in which—

Figure 1 presents a perspective view of my device detached from the clip; and Fig. 2 presents a perspective view of the clip and thill-coupling with my device attached.

The object sought by this invention is to provide a pole or thill coupling which will effectually prevent the pole or thills from becoming accidentally detached from the axle of the vehicle, and to act as an anti-rattler, it being a complete prevention of the rattling noise incident to the usual wear of the couplings and pin, while it effectually prevents the wear of either couplings or pin; and it consists in the construction and attachment to the clip and thill-coupling of a double arm lever-clasp, as hereinafter set forth.

In the drawing, Fig. 2 represents the clip, which straddles the front axle, having nuts $A^1$ and $A^2$ screwed on its ends, and above these nuts a coupling-plate, B, is placed on the clip, which extends forward of the axle in a rounded form, so as to receive a nut, C, screwed on its end. On the rounded portion of the coupling-plate, and behind the nut C, is placed the double-arm lever-clasp D, whose lower end E rests firmly against the nut $A^1$. The upper portion is formed into two parallel arms, which pass up around in front and over the thill-iron head of the coupling, and which is held firmly by the nut C.

What I claim as my invention, and desire to secure by Letters Patent, is—

1. The combination, with the clip-iron having nuts $A^1$ and $A^2$, of the coupling-plate B, clasp D E, and nut C, as and for the purpose set forth.

2. The double-armed lever-clasp, having forked curved ends D and arm E, applied to a thill-coupling, substantially as and for the purpose set forth.

EDWARD BRICK.

Witnesses:
THOMAS C. CONNOLLY,
H. H. BURTON.